(12) United States Patent
Haake et al.

(10) Patent No.: US 7,678,837 B2
(45) Date of Patent: Mar. 16, 2010

(54) DEVICE AND METHOD FOR REMOVING CARBON MONOXIDE FROM A GASEOUS STREAM CONTAINING HYDROGEN

(75) Inventors: Mathias Haake, Mannheim (DE); Stefan Kotrel, Ludwigshafen (DE); Michael Karcher, Schwetzingen (DE); Rudi Blümmel, Edingen-Neckarhausen (DE)

(73) Assignee: BASF SE, Ludwigshafen (DE)

( * ) Notice: Subject to any disclaimer, the term of this patent is extended or adjusted under 35 U.S.C. 154(b) by 188 days.

(21) Appl. No.: 11/813,631

(22) PCT Filed: Jan. 9, 2006

(86) PCT No.: PCT/EP2006/050100

§ 371 (c)(1),
(2), (4) Date: Jul. 10, 2007

(87) PCT Pub. No.: WO2006/074988

PCT Pub. Date: Jul. 20, 2006

(65) Prior Publication Data

US 2008/0108715 A1    May 8, 2008

(30) Foreign Application Priority Data

Jan. 11, 2005    (DE) .................... 10 2005 001 290

(51) Int. Cl.
  *C07C 27/00*    (2006.01)
(52) U.S. Cl. .................... 518/715; 518/700; 518/701; 518/713
(58) Field of Classification Search ................. 518/700, 518/715, 701, 713
  See application file for complete search history.

(56) References Cited

U.S. PATENT DOCUMENTS

| 4,043,945 | A | * | 8/1977 | Fukui et al. ................. 502/301 |
| 4,491,564 | A |   | 1/1985 | Gray |
| 5,904,913 | A |   | 5/1999 | Böhm et al. |
| 6,923,948 | B2 |  | 8/2005 | Baumann et al. |
| 2004/0223908 | A1 |  | 11/2004 | Holladay et al. |
| 2006/0177727 | A1 | * | 8/2006 | Ruth et al. .................... 429/44 |

FOREIGN PATENT DOCUMENTS

| DE | 196 03 222 C1 | 8/1997 |
| DE | 100 50 709    | 4/2002 |
| EP | 1 246 286 A1  | 10/2002 |
| GB | 2 188 251     | 9/1987 |

OTHER PUBLICATIONS

International Preliminary Report on Patentability (Chapter II of the PCT) for International application No. PCT/EP2006/050100. (16 pages).
Ullmann's Enclyclopedia of Industrial Chemistry, Sixth, Completely Revised Edition, vol. 17, pp. 168-171.

* cited by examiner

*Primary Examiner*—Jafar Parsa
(74) *Attorney, Agent, or Firm*—Connolly Bove Lodge & Hutz LLP

(57) ABSTRACT

The invention relates to a process for removing carbon monoxide from a hydrogenous gas stream by reacting the carbon monoxide with hydrogen to give methane and water in the presence of a heterogeneous catalyst. In this process, the catalyst is present in the form of a thin-layer catalyst on a support material. The invention further relates to an apparatus for carrying out the process.

15 Claims, No Drawings

DEVICE AND METHOD FOR REMOVING CARBON MONOXIDE FROM A GASEOUS STREAM CONTAINING HYDROGEN

CROSS REFERENCE TO RELATED APPLICATIONS

This application is a National Phase filing under 35 U.S.C. §371 of PCT/EP2006/050100 filed Jan. 9, 2006, which claims priority to German Patent Application No. 102005001290.6, filed Jan. 11, 2005. The entire contents of each of the above-applications are incorporated herein by reference.

The invention relates to an apparatus for removing carbon monoxide from a hydrogen-rich gas stream by reacting the carbon monoxide with hydrogen to give methane and water, and to a process using the apparatus.

Carbon monoxide-contaminated, hydrogenous gas streams are obtained, for example, in hydrogenations. Since not all of the hydrogen supplied to the hydrogenation reactor is converted in a hydrogenation, the product stream leaving the reactor is separated into a gas and a liquid phase. The main component of the gas phase is hydrogen. However, it may be contaminated by carbon monoxide formed in the hydrogenation. To discharge impurities, a portion of the gas stream is discharged from the process as offgas, the remainder of the gas stream is passed back into the hydrogenation reactor. The proportion of impurities in the gas stream may be adjusted via the amount of offgas and the amount of fresh gas supplied. However, this method is no longer practicable when the process becomes uneconomic as a result of excessively large amounts of offgas. In addition to the hydrogen losses, the heat losses and the increased harmful substance emissions as a result of the high offgas streams also have to be taken into account.

Many hydrogenations are carried out in the presence of noble metal catalysts. Owing to their high energy of CO adsorption, these catalysts tend readily to poisoning and reversible deactivation in CO-containing gases. For this reason, it is necessary to remove the carbon monoxide from the cycle gas.

To this end, the cycle gas may be conducted through a purifying stage in which the carbon monoxide is reacted with hydrogen to give methane and water. The methane and water formed in the reaction are harmless to the hydrogenation.

The removal of carbon monoxide from a hydrogen-rich gas mixture formed by a methanol reforming reaction is known, for example, from DE-C 196 03 222. In this case, carbon monoxide is removed by selective methanization using an Ru- and $TiO_2$-containing catalyst material and/or by means of selective oxidation using a Pt- and $TiO_2$-containing catalyst material. The thus obtained hydrogen is then used in fuel cell-driven electrical vehicles.

In addition to methanol, $H_2$ may also be recovered by using a multitude of further hydrocarbons. In these cases, too, the removal of the CO from the $H_2$-containing gas stream is necessary and may be effected, for example, by methanization. The use of a methanization stage for the operation of a combined heat and power plant with a gas generation system and a fuel cell is known from EP-A 1 246 286. In this system, the hydrogen is obtained from natural gas.

The reaction of carbon monoxide with hydrogen to methane and water is described for example, in Ullmann's Encyclopedia of Industrial Chemistry, 6th Edition, 2000 Electronic Release, Chapters 5.3.2 and 5.3.3. The reaction is carried out in the presence of a nickel oxide-containing, and in some cases additionally chromium oxide-containing, catalyst. This has to be reduced before the reaction is started up. The support used is alumina or kieselguhr. In comparison to the catalysts known from steam reformation, the metal content has to be very high.

One disadvantage of the fixed bed catalysts known from the prior art is their high pressure drop. This large pressure drop necessitates, especially in processes in which the hydrogenous gas is conducted through the purifying stage as cycle gas, a large-scale cycle gas compressor in order to compensate for the pressure drop. With increasing size of the cycle gas compressor, both the capital costs and the operating costs increase. A further disadvantage of the solid state catalyst is that a catalyst discharge cannot be avoided, since the attrition of the catalyst particles with one another forms catalyst dusts which are entrained by the gas stream and can thus be distributed by the gas stream in the entire cycle gas stage. The current industrial solution provides for the use of dust separators in which the catalyst dusts are removed from the gas stream. However, these dust separators likewise lead to an increase in the pressure drop in the cycle gas stream.

A low pressure drop is also necessary in gas generation systems for fuel cells in order to minimize performance losses resulting from the compression of the fuel (for example natural gas).

It is an object of the invention to provide a process for removing carbon monoxide from a hydrogenous gas stream, which has a low pressure drop in comparison to fixed bed catalysts and in which a catalyst discharge due to the gas stream is avoided.

The object is achieved by a process for removing carbon monoxide from a hydrogenous gas stream by reacting the carbon monoxide with hydrogen to give methane and water in the presence of a heterogeneous catalyst. In this process, the catalyst is present in the form of a thin-layer catalyst.

In this context, a thin-layer catalyst is a catalytically coated support material, the thickness of the catalyst layer being in the range from 0.01 µm to 100 µm.

The process for removing carbon monoxide is preferably carried out in a methanization reactor.

Suitable methanization reactors for removing the carbon monoxide from the gas stream are any of the type known to those skilled in the art. The reactor is preferably a tubular reactor. The thin-layer catalyst is accommodated in the methanization reactor.

The methanization reactor may be a standalone reactor or form one reactor zone within a multizone reactor. For example, a hydrogenation may be carried out in a first reactor zone and the methanization of the carbon monoxide formed in the hydrogenation may be carried out in a second reactor zone which follows the first reactor zone within one reactor.

In order to start the reaction of carbon monoxide with hydrogen to give methane and water, it is necessary to heat the gas stream to reaction temperature. The reaction temperature is preferably in the range from 80° C. to 500° C., more preferably in the range from 100° C. to 300° C. and particularly preferably in the range from 100° C. to 200° C.

The reaction temperature may be achieved, for example, by the wall of the methanization reactor having a jacketed design and a heat carrier flowing therein. Suitable heat carriers are, for example, steam or thermal oils. In addition to the external heating of the methanization reactor via a jacket, the reaction temperature may also be achieved by the methanization reactor being flowed through by a hot inert gas stream before the hydrogenous gas stream is added. An example of a suitable inert gas stream is nitrogen.

Since the hydrogenous gas stream generally only comprises small traces of carbon monoxide, there is no need to remove the heat produced in the reaction of the carbon monoxide with hydrogen to give methane and water through the reactor walls. However, the possibility also exists of operating the methanization reactor isothermally and removing the heat released in the reaction of the carbon monoxide. However, it has to be ensured in this case that the temperature in the methanization reactor does not fall below the reaction temperature.

To prepare the thin-layer catalyst, the catalytically active component may be applied to the support material under reduced pressure by sputtering application or by electron beam evaporation. A further possibility is the impregnation of the catalytically active component onto the support material.

The vapor deposition of the catalytically active component under reduced pressure may be carried out, for example, as described in DE-A 199 63 443 for Raney alloys. To coat the support materials, the catalytically active component is evaporated under reduced pressure and condensed uniformly onto the support. The evaporation is effected with the typical processes known to those skilled in the art, for example thermally, by electron beam evaporation, by sputtering application, or combination of these processes. The layers, obtained by the condensing application, of the catalytically active component applied by vapor deposition are generally extremely thin and are in the range from 0.01 μm to 100 μm.

In the course of the impregnating application of the catalytically active component, the support material is impregnated with an impregnating medium which comprises the catalytically active component, its constituents, and/or precursors of its constituents. When the impregnating medium comprises precursor compounds, they are converted in the course of the further processing to the actual catalytically active component. In general, the catalytically active component, its constituents, the precursors of the catalytically active component or the precursors of its constituents or mixtures thereof are dissolved or suspended in a solvent or suspension medium. When one of the substances with which the support material is impregnated is in liquid form, it is possible to dispense with the solvent or suspension medium.

In order to improve the adhesion of the active composition on the support material, it is preferably pretreated before the application of the catalytically active component. Examples of a pretreatment are the coating of the support with adhesion promoters or a roughening by mechanical or thermal processes. Mechanical processes are, for example, grinding or sandblasting; the thermal processes include heating, plasma etching or ignition. In order to prevent the substances applied to the support material being deposited in nonuniform particle size, the impregnation process, as described in EP-A 0 965 384, is preferably carried out with an impregnation medium whose surface tension has a maximum of 50 mN/m.

After the impregnation, the impregnated support material is generally dried in a known manner in order to free it of solvent or suspension medium. To this end, the impregnated support material is preferably heated. At the same time or instead of this, a vacuum may also be applied. When precursor compounds which can be decomposed thermally to give active composition are applied, they are decomposed thermally to give active composition in a known manner. To this end, the impregnated and, if appropriate, dried support material is heated to the temperature sufficient for this purpose. The temperature required depends upon the catalytically active component.

In addition to that described here, the impregnation may also be effected in any other manner known to those skilled in the art.

The preferred process for applying the catalytically active component to the support material is impregnation.

Thin-layer catalysts in which the catalytically active component is applied to a support material in the form of a woven fabric or knitted fabric are notable in that the gas permeability of the catalyst can be adjusted optimally with simultaneously high carbon monoxide conversion owing to the flexibility of the woven fabric or knitted fabric. In particular, owing to the adjustability of the gas permeability, a minimal pressure drop in comparison to fixed bed catalysts can be established. The mechanical and static stress on the plant is also lower than in the case of a plant with fixed bed catalyst.

A further advantage of thin-layer catalysts is that the catalyst layer features particular attrition stability. This prevents catalyst particles of the thin-layer catalyst from getting into the gas stream and being discharged from the reactor together with it.

The support material used for the thin-layer catalysts used in accordance with the invention may be a multitude of foils and woven fabrics, and also knitted fabrics, for example loop-drawingly knitted fabrics. Particularly suitable are woven fabrics or loop-drawingly knitted fabrics. It is also possible in accordance with the invention to use woven fabrics with different weave types, such as plain weave, twill weave, Dutch weave, five-shaft satin weave or else other specialty weaves. In one embodiment of the invention, useful woven meshes are woven from weavable metal wires such as iron, spring steel, brass, phosphor bronze, pure nickel, Monel, aluminum, silver, nickel silver, nickel, chromium nickel, chromium steel, nonrusting, acid-resistant and high-temperature-resistant chromium nickel steels, and titanium. The same applies to knitted fabrics, for example loop-drawingly knitted fabrics.

It is likewise possible to use woven fabrics or knitted fabrics made of inorganic materials such as $Al_2O_3$ and/or $SiO_2$.

It is also possible in one embodiment of the invention to use synthetic wires and woven fabrics or knitted fabrics made of plastics. Examples are polyamides, polyesters, polyvinyls, polyolefins such as polyethylene, polypropylene, polytetrafluoroethylene and other plastics which can be processed to give woven fabrics or knitted fabrics.

Preferred support materials are metal foils or metal fabrics, for example stainless steels having the materials numbers 1.4767, 1.4401, 2.4610, 1.4765, 1.4847, 1.4301, etc. The designation of these materials with the materials numbers specified follows the specifications of the materials numbers in the "Stahleisenliste" [list of steels], published by Verein Deutscher Einsenhüttenleute, 8th Edition, pages 87, 89 and 106, Verlag Stahleisen mbH, Dusseldorf, 1990. The material, also known under the name Kanthal, of materials number 1.4767 is particularly preferred.

The metal foils and metal fabrics are particularly suitable since they can be roughened by a heat treatment on the surface before the coating with catalytically active compounds or promoters. To this end, the metallic supports are heated in an oxygenous atmosphere such as air at temperatures of from 400 to 1100° C., preferably from 800 to 1000° C., for from 0.5 to 24 hours, preferably from 1 to 10 hours. In one embodiment of the invention, this pretreatment allows the activity of the catalyst to be controlled or increased.

Thin-layer catalysts are notable in that only a small amount of the catalytically active component is required at a high conversion owing to the low layer thickness. For instance, the surface loading of the support material with catalyst is preferably <5000 mg of catalyst per $m^2$ of surface area, more preferably <3000 mg of catalyst per $m^2$ of surface area and in particular <2000 mg of catalyst/$m^2$ of surface area.

Suitable catalytically active materials for converting carbon monoxide and hydrogen to methane and water are ruthenium, nickel, platinum, palladium, rhodium, copper or mixtures of these elements. In addition, these materials may also be doped with alkali metals, alkaline earth metals or oxides thereof. Particularly suitable as a catalytically active component is ruthenium.

In addition to attrition stability, the thin-layer catalyst also offers economic advantages, since, owing to the thin layers, only small amounts of the catalytically active component are required. Since a majority of the suitable catalytically active components are noble metals having a high purchase price, a portion of the capital costs arising as a result of the catalyst can be minimized as a result of the small amounts required.

The catalysts prepared in accordance with the invention by vapor deposition, sputtering or impregnation, especially catalyst fabrics, loop-drawn catalyst knits and catalyst foils have very good adhesion strength of the catalytically active compounds or promoters. Therefore, they can be reshaped, cut and processed, for example, to monolithic catalyst elements without the catalytically active compounds or promoters becoming detached. It is possible to produce from the inventive catalysts fabrics, loop-drawn catalyst knits and catalyst foils structured catalyst packings of any shape for a reactor, for example flow reactor, plate reactor or reactor designed as a spiral heat exchanger. It is possible to produce structured catalyst packing elements with different geometries, as are known from distillation and extraction technology. Examples of advantageous inventive structured catalyst packing geometries which offer the advantage of a low pressure drop in operation are those of the Montz A 3 design and Sulzer BX, DX and EX design. One example of an inventive catalyst geometry, composed of catalyst foils or expanded catalyst metal foils, is that of the Montz BSH type.

In addition to the production of structured catalyst packings in which the fabric, loop-drawingly knitted fabric or the foil is initially coated with the active component by vapor deposition or impregnation and is subsequently shaped to a structured catalyst packing, it is also possible first to produce a structured packing of any shape from an uncoated woven fabric or knitted fabric or an uncoated foil, and then to coat it with the active component by impregnation or vapor deposition.

The amount of catalyst processed per unit volume, in particular amount of catalyst fabric, amount of loop-drawn catalyst knit or amount of catalyst foil, can be controlled within a wide range, which gives rise to a different size of the orifices or channel widths in the catalyst fabric, loop-drawn catalyst knit or in the catalyst foil. Appropriate selection of the amount of catalyst fabric, loop-drawn catalyst knit or catalyst foil per unit volume allows the maximum pressure drop in the reactor, for example flow or distillation reactor, to be adjusted, and the catalyst thus to be adjusted to experimental requirements.

The catalyst used in accordance with the invention preferably has a monolithic form, as described, for example, in EP-A-0 564 830. Further suitable catalysts are described in EP-A-0 218 124 and EP-A-0 412 415.

A further advantage of the monolithic catalysts used in accordance with the invention is the good fixability in the reactor bed, so that it can be used very effectively, for example, in hydrogenations in the liquid phase in the liquid phase mode at high cross-sectional loading. In contrast, in the case of conventional supported catalysts, there exists the risk of vortexing in the catalyst bed, which can lead to possible attrition or decomposition of the shaped bodies. In gas phase hydrogenation, the structured catalyst packing is resistant in the event of impact or vibrations.

In a preferred embodiment, the thin-layer catalyst is finished in the form of a structured packing. Suitable low-pressure drop structured fabric packings are described, for example, in WO-A 97/02890. According to this, the metal fabric is shaped to structured packing elements which consist of dimensionally stable layers of fabric material or fabric-like material in an ordered structure and in mutual contact. The mutually contacting layers of fabric material or fabric-like material are arranged in such a way that they form a multitude of narrow flow channels, preferably virtually triangular, virtually rectangular or virtually equilaterally hexagonal flow channels, the angle of inclination of the serration of the individual fabric layers of the structured packing in each case being inclined against the axis of the column. To ensure the mechanical stability of the structured packing elements, wires or thin rods may be mounted in a suitable arrangement, preferably at right angles, between the fabric layers. In a further embodiment, the fabric layers may be bonded to one another in a fixed manner at some contact points.

From individual structured packing elements, preference is given to forming disc-shaped reactor internals. The individual mutually contacting layers of fabric material are arranged both in the structured packing elements and in the disc-shaped reactor internals formed therefrom preferably in such a way that the flow channels which form run alternately in the opposite sense when the angle of inclination of the serration of the individual fabric layers against the axis of the reactor is greater than 0.

In the case of the formation of disc-shaped reactor internals from the structured packing elements, the reactor internals preferably have the particular internal diameter of the methanization reactor and a height of from 40 to 300 mm. Within the methanization reactor, a plurality of reactor internals, each of which have the internal diameter of the methanization reactor, may be arranged one on top of another, preference being given in the case of reactor internals being arranged one on top of another to the disc-shaped reactor internals each being rotated by about 90° relative to one another.

A minimum pressure drop is achieved by the angle of inclination of the serration of the individual fabric layers of the structured packing against the reactor axis being within the range from 0 to 25°, preferably in the range from 3 to 14° and in particular in the range from 4 to 6°.

Good mixing of the gases flowing through the methanization reactor is achieved by the channels formed in the structured packing elements being inclined relative to one another.

In a preferred embodiment, the process for removing carbon monoxide from a hydrogenous gas stream is used to clean cycle gas from a chemical plant. Cycle gas refers to the gas which is conducted in circulation within the chemical plant.

In a further preferred embodiment, the process according to the invention for removing carbon monoxide from a hydrogenous gas stream is used to clean the hydrogenous gas fed to a fuel cell.

In a particularly preferred embodiment, the process according to the invention is used to remove carbon monoxide from the cycle gas of a hydrogenation. Since many hydrogenations are carried out over noble metal-containing catalysts, such as platinum or palladium, which, owing to their high energy of carbon monoxide absorption, tend to be poisoned and reversibly deactivated in carbon monoxide-containing gases, a high catalyst lifetime requires the removal of carbon monoxide from the gas stream. The carbon monoxide can be introduced either by the feed, i.e. the component which is fed to the reactor to be hydrogenated, or by the fresh gas, i.e. the hydrogen fed to the process from outside. In addition, the carbon monoxide may also be formed within the hydrogenation plant.

For the hydrogenation, the substance to be hydrogenated and hydrogen are fed to the hydrogenation reactor. In the hydrogenation reactor, the component to be hydrogenated reacts with the hydrogen in the presence of the hydrogenation catalyst. This reaction is carried out with an excess of hydrogen. The product and also the unconverted hydrogen and reaction by-products are removed from the hydrogenation reactor and fed to a separator in which the product is removed. In addition to the product, a hydrogenous gas stream is also drawn off from the separator. In addition to hydrogen, the gas stream comprises impurities which have either be fed to the hydrogenation reactor with the fresh gas or the feed or been formed in the hydrogenation reactor by the reaction. To remove the impurities from the gas stream, a portion of the gas stream is drawn off from the process as offgas.

To remove carbon monoxide from the hydrogenous gas stream, the gas stream is subsequently fed to a methanization reactor in which the carbon monoxide is converted to methane and water. The hydrogenous gas stream thus freed of carbon monoxide is then fed again to the hydrogenation reactor. A substream of the cycle gas is preferably discharged as offgas in order to prevent accumulation of the inert components formed in the methanization reactor, especially of methane. In order to replace the hydrogen converted in the hydrogenation and the hydrogen drawn off from the process as offgas, hydrogen is added to the gas stream, preferably after it has left the apparatus for removing carbon monoxide, from outside in the same amount as it has been converted in the hydrogenation reactor and drawn off from the process as offgas. This ensures that the reactor is flowed through with a constant hydrogen stream.

The carbon monoxide forming within the plant may be formed from the reaction mixture, for example, in the hydrogenation reactor, in the separator or in the lines between the individual parts of the plant.

The introduction of carbon monoxide via the feed is possible especially when the cycle gas stage is a synthetic stage connected downstream of another stage. In this case, the carbon monoxide is formed in the preceding stage and introduced into the cycle gas stage with the reaction stream. When the preceding stage is likewise a hydrogenation, the carbon monoxide may be added deliberately to the reactant stream in order to moderate the activity of the catalyst of the preceding stage. This is the case, for example, when the selective hydrogenation of a triple bond to a double bond is to be carried out over palladium in the preceding stage and the selectivity is increased via the controlled addition of carbon monoxide. In this case, carbon monoxide can get into the stage which follows the selective hydrogenation via the reactant stream saturated with carbon monoxide and bring about there an undesired attenuation of the noble metal catalyst used.

Carbon monoxide is always formed within the chemical plant in which the hydrogenous gas stream is conducted as cycle gas when, in addition to the intended reaction, for example the hydrogenation, carbon monoxide elimination proceeds as a side reaction under the operating conditions. Reactants which tend to such a side reaction are, for example, aldehydes, especially when they are $\alpha,\beta$-unsaturated or have an aromatic radical.

Typical examples of aldehydes which are $\alpha,\beta$-unsaturated are crotonaldehyde, citral, dehydrolysmeral, myrtenal or cinnamaldehyde.

Typical examples of saturated aldehydes are citronellal or phenylpropionaldehyde.

Aldehydes having an aromatic radical are, for example, benzaldehydes, pyridinecarbaldehydes, furaldehydes and thiophene carbaldehydes.

Instead of the aldehydes or in addition to the aldehydes, acyl halides, $\alpha$-ketophosphonates or acyl cyanides may also occur as a carbon monoxide source in the reactant stream.

The elimination of carbon monoxide may proceed under base, acid or free radical catalysis. The catalytic elimination of carbon monoxide over homogeneous metal complexes is just as possible as the elimination of carbon monoxide over metallic heterogeneous catalysts.

In a further particularly preferred embodiment, the process according to the invention is used to remove CO from the $H_2$-containing gas stream for the operation of a fuel cell. In this case, the methanization reactor is part of a stationary fuel cell system. $H_2$ is obtained in a reformation reactor from the natural gas used as the fuel for the fuel cell. After the reformation, the $H_2$-containing product gas stream is passed through the methanization reactor, with the CO present in the gas stream reacting to give methane and water. The gas freed of CO by this process is suitable for the operation of a fuel cell. The use of a thin-layer catalyst allows the pressure drop in the gas generation system of the fuel cell to be kept low at high superficial velocity of the gas stream. This allows the performance loss of the fuel cell system to be reduced, since less work has to be performed for the introduction and compression of the fuel stream to be reformed. The lower performance loss improves the overall efficiency of the fuel cell system.

When methanol is also present as an impurity in the hydrogenous gas stream in addition to the carbon monoxide, it is necessary to remove the carbon monoxide from methanol by cleaning the methanol before the hydrogenous gas stream is fed into the methanization reactor. This may be effected, for example, in a gas scrubbing. The removal of the methanol is necessary because the methanol is otherwise cleaved in the methanization reactor in the presence of the heterogeneous catalyst to give carbon monoxide and hydrogen. This results in an increase in the proportion of carbon monoxide in the gas stream and it is necessary for full conversion of the carbon monoxide for the reactor to have very much larger dimensions. This leads to additional capital and operating costs.

EXAMPLES

Example 1

Preparation of a Thin-Layer Catalyst

A woven Kanthal fabric precalcined at 900° C. is impregnated with an Ru nitrosyl nitrate solution and subsequently dried under air at 120° C. for one hour. For the impregnation, an aqueous 20.3% by weight $Ru(NO)NO_3)_3$ solution was diluted to 0.7% by weight of Ru with distilled water. The impregnation was effected in a manual impregnating unit in which the metal fabric ribbon is drawn through a flat dish which is filled with the impregnating solution. This wetted the metal fabric with the Ru-containing impregnating solution. The still moist, wetted metal fabric ribbon was subsequently predried in a drying zone with the aid of IR radiators and subsequently dried in a drying oven at 120° C. in the presence of ambient air. The drying time was 1 h. After the drying, the IR-impregnated Kanthal fabric was rolled to form a structured fabric packing. The finished Ru-saturated Kanthal fabric is reduced at ambient pressure under an $H_2$ atmosphere at 120° C. in the methanization reactor for 4 hours. The surface loading with ruthenium corresponds to 580 mg of Ru/m² of Kanthal fabric.

Example 2

Methanization of CO

An Ru/Kanthal catalyst prepared according to Example 1 was tested in an oil-heated jacketed tube which had been charged at ambient pressure with a CO-containing hydrogen stream. The residual CO concentration in the offgas stream downstream of the reactor was measured by means of a CO analyzer from Uras. The maximum catalyst hourly space velocity as a function of temperature and CO concentration at which full degradation of the carbon monoxide was observed in the methanization experiment is shown in table 1. In the first column, the temperature at which the methanization was carried out is recorded. The second column shows the GHSV (gas hourly space velocity) at which CO was degraded fully at a starting concentration of 25 ppm. In the third column, the GHSV is recorded at which CO was degraded fully at a starting concentration of 100 ppm. Thus, at a reactor temperature of 180° C. and a GHSV of 3053 h$^{-1}$, a CO concentration of 100 ppm was degraded fully over the course of 7 hours. In contrast, at 80° C., full degradation of the carbon monoxide was achieved at a maximum GHSV of approx. 325 h$^{-1}$ and a starting CO concentration of 25 ppm.

TABLE 1

Catalyst hourly space velocity as a function of temperature

| | Starting CO concentration | |
|---|---|---|
| T [° C.] | 25 ppm GHSV [h$^{-1}$] | 100 ppm GHSV [h$^{-1}$] |
| 80 | 325 | — |
| 100 | 1299 | — |
| 120 | 1299 | — |
| 140 | 1949 | — |
| 160 | 6496 | 1299 |
| 180 | — | 3053 |

Example 3

Methanization of the Lysmeral Emission

Lysmeral was boiled under reflux in the presence or a Pd/C catalyst and the gases which formed were driven out of the reaction charge with H$_2$ and passed through an Ru-Kanthal fabric packing which was accommodated in an oil-heated jacketed tube. The CO loading of the gas supplied was in the range from 150 to 250 ppm. The temperature was 140° C. within the first 15 hours and 180° C. in the further course of the experiment. The carbon monoxide analysis of the gas stream leaving the reactor showed complete degradation of the carbon monoxide supplied. The GHSV was 2600 h$^{-1}$.

Example 4

Preparation of a Further Thin-Layer Catalyst

To prepare a CO methanization catalyst, structured packings composed of Ru-impregnated woven Kanthal fabric pre-calcined at 900° C., without corrugation, were rolled to form 9.5 mm-thick structured fabric packings. In the middle of the structured packings there was a recess for a thermoelement. The diameter of this recess was 3.17 mm. Before the finishing, the fabric was impregnated with an Ru(III) nitrate solution and subsequently dried and heat-treated at 200° C. for 2 hours under air. Overall, the reactor was charged with 1170 cm². Immediately before the actual experiment, the finished catalyst was reduced stepwise at 80° C., 120° C., 180° C. and 200° C. in the methanization reactor, in each case for 1 h. The surface loading with Ru was 2075 mg of Ru/m² of Kanthal fabric.

Example 5

Methanization of CO

The Ru/Kanthal catalyst prepared according to Example 4 was charged in an oil-heated jacketed tube at 2013 mbara with a CO-containing H2 stream of known concentration. The overall reactor was charged with 6 individual structured packings, of which 5 packings were each 8 cm in length and 1 packing was 5 cm in length. The reactant composition included, in addition to H$_2$ and CO, also CO$_2$, N$_2$ and H$_2$O in a molar ratio which is typical of the reforming of hydrocarbon for fuel cell applications. Table 2 shows the gas composition upstream and downstream of the reactor. The GHSV established was 1800 h$^{-1}$. The reactor temperature was 200° C. During the reaction, no pressure drop was measured over the structured packing, i.e. the pressure drop during the measurement must have been less than 100 mbar (sensitivity of the measurement apparatus). In this experiment, the CO was degraded almost fully.

TABLE 2

Gas composition upstream and downstream of the methanization reactor. The gas proportions are based on the dry gas. The H$_2$O proportion of the undried gas was 25% by volume.

| | Proportion, % by volume | |
|---|---|---|
| | upstream of reactor | downstream of reactor |
| H$_2$ | 45.6% | 42.8% |
| CO | 0.39% | 0.01% |
| CO$_2$ | 13.5% | 12.9% |
| CH$_4$ | 0.6% | 1.6% |
| N$_2$ | 39.9% | 42.7% |

What is claimed is:

1. A process for removing carbon monoxide from a hydrogenous gas stream, comprising:
   reacting the carbon monoxide with hydrogen to give methane and water in the presence of a heterogeneous catalyst,
   wherein the catalyst is present as a thin-layer catalyst on a support material, the thin-layer catalyst having a thickness in the range from 0.01 μm to 100 μm, wherein the support material is in the form of a woven fabric or knitted fabric.

2. The process according to claim 1, wherein the woven fabric is finished in the form of a structured packing.

3. The process according to claim 1, wherein the surface loading of the support material with catalyst is <3000 mg of catalyst/m² of surface area.

4. The process according to claim 1, wherein the catalyst is selected from the group consisting of elements Ru, Ni, Pt, Pd, Rh, Cu and mixtures thereof.

5. The process according to claim 1, wherein the hydrogen-rich gas stream is cycle gas from a chemical plant.

6. The process according to claim 5, wherein the cycle gas is contaminated hydrogen from a hydrogenation.

7. The process according to claim 6, wherein α,β-unsaturated aldehydes or aldehydes having an aromatic radical are hydrogenated.

8. The process according to claim 5, wherein a portion of the cycle gas is discharged to the environment as offgas.

9. The process according to claim 1, wherein the hydrogen-rich gas stream is used as fuel for a fuel cell.

10. The process according to claim 2, wherein the surface loading of the support material with catalyst is <3000 mg of catalyst/m² of surface area.

11. The process according to claim 2, wherein the catalyst is selected from the group consisting of elements Ru, Ni, Pt, Pd, Rh, Cu and mixtures thereof.

12. The process according to claim 3, wherein the catalyst is selected from the group consisting of elements Ru, Ni, Pt, Pd, Rh, Cu and mixtures thereof.

13. The process according to claim 2, wherein the hydrogen-rich gas stream is cycle gas from a chemical plant.

14. The process according to claim 3, wherein the hydrogen-rich gas stream is cycle gas from a chemical plant.

15. The process according to claim 4, wherein the hydrogen-rich gas stream is cycle gas from a chemical plant.

* * * * *